United States Patent
Hong

(10) Patent No.: US 11,788,698 B2
(45) Date of Patent: Oct. 17, 2023

(54) ROTATION LIGHT SOURCE DEVICE AND LAMP SYSTEM THEREOF

(71) Applicants: HYUNDAI MOTOR COMPANY, Seoul (KR); KIA CORPORATION, Seoul (KR)

(72) Inventor: Seung-Pyo Hong, Incheon (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 116 days.

(21) Appl. No.: 17/517,173

(22) Filed: Nov. 2, 2021

(65) Prior Publication Data

US 2022/0357007 A1    Nov. 10, 2022

(30) Foreign Application Priority Data

May 6, 2021    (KR) .................... 10-2021-0058473

(51) Int. Cl.
| | |
|---|---|
| *F21S 10/00* | (2006.01) |
| *F21S 10/06* | (2006.01) |
| *F21V 23/00* | (2015.01) |
| *F21V 7/04* | (2006.01) |
| *H02K 21/24* | (2006.01) |
| *F21V 11/08* | (2006.01) |
| *F21Y 113/10* | (2016.01) |
| *F21Y 115/10* | (2016.01) |

(52) U.S. Cl.
CPC .............. *F21S 10/063* (2013.01); *F21V 7/04* (2013.01); *F21V 11/08* (2013.01); *F21V 23/003* (2013.01); *H02K 21/24* (2013.01); *F21Y 2113/10* (2016.08); *F21Y 2115/10* (2016.08)

(58) Field of Classification Search
CPC .......... F21V 7/04; F21V 11/08; F21V 23/003; H02K 21/24; F21S 10/063
See application file for complete search history.

(56) References Cited

U.S. PATENT DOCUMENTS 5,694,376 A * 12/1997 Sullivan .................... G04G 9/02
368/240
6,705,745 B1 * 3/2004 Pederson ............. B60Q 1/2611
362/800

(Continued)

FOREIGN PATENT DOCUMENTS

KR    10-2005-0103391 A    10/2005

*Primary Examiner* — Gerald J Sufleta, II
(74) *Attorney, Agent, or Firm* — Morgan, Lewis & Bockius LLP

(57) ABSTRACT

A lamp system applied to a vehicle according to the present disclosure is provided with any one of a reflector, an optical member, a digital micromirror display (DMD), a shield, or a shield optical module, and combined with a rotation light source device for generating light of a specific LED turned on at a synchronized rotation position of one or more LED chips of first to Nth LED chips (N is an integer of 2 or more) per one rotation while being rotated by a current application of a signal transmitter receiving a lamp turn-on signal of the vehicle, thereby generating various lighting patterns even while eliminating all problems of increasing the layout/decreasing the light amount/increasing the amount of property changed, lowering the reflection efficiency/transmission efficiency, and losing the optical efficiency with the circular LED array.

16 Claims, 12 Drawing Sheets

(56) References Cited

U.S. PATENT DOCUMENTS

| | | | |
|---|---|---|---|
| 2004/0125601 A1* | 7/2004 | Coates | H05B 45/30 348/E9.027 |
| 2005/0047167 A1* | 3/2005 | Pederson | F21S 43/26 362/542 |
| 2007/0263376 A1* | 11/2007 | Wilkinson | B60Q 1/2611 362/35 |
| 2007/0281581 A1* | 12/2007 | Rago | A63H 1/24 446/242 |
| 2009/0059557 A1* | 3/2009 | Tanaka | G03B 21/2033 362/35 |
| 2010/0097448 A1* | 4/2010 | Gilbert | G06T 3/60 345/82 |
| 2017/0299139 A1* | 10/2017 | Masuda | F21S 41/32 |
| 2021/0341127 A1* | 11/2021 | Nakanishi | F21S 41/675 |

* cited by examiner

FIG.1
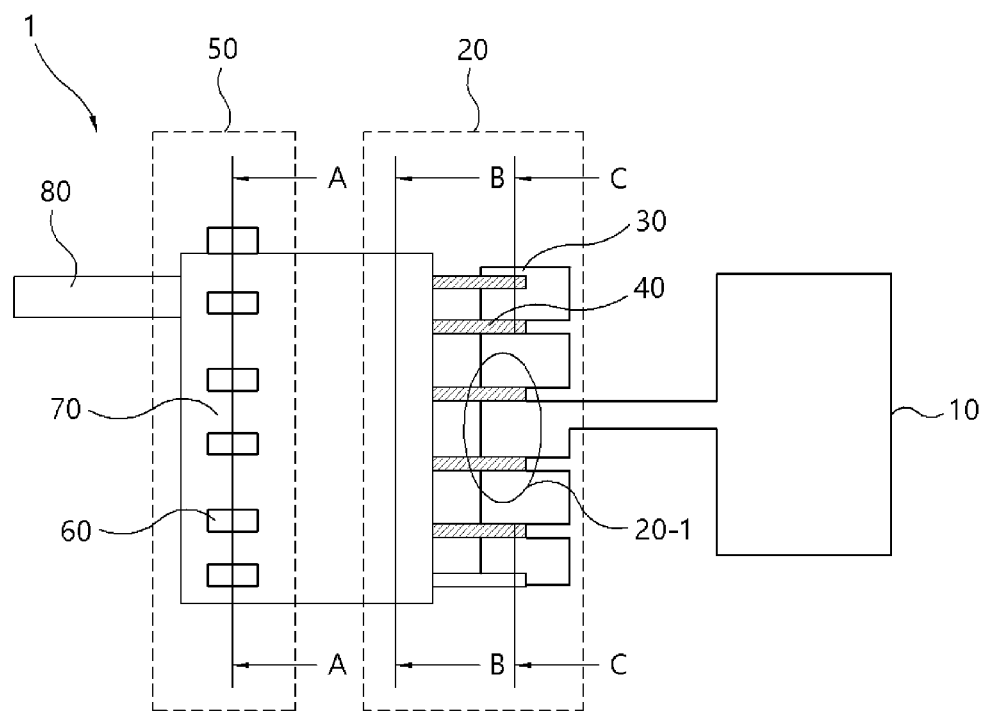
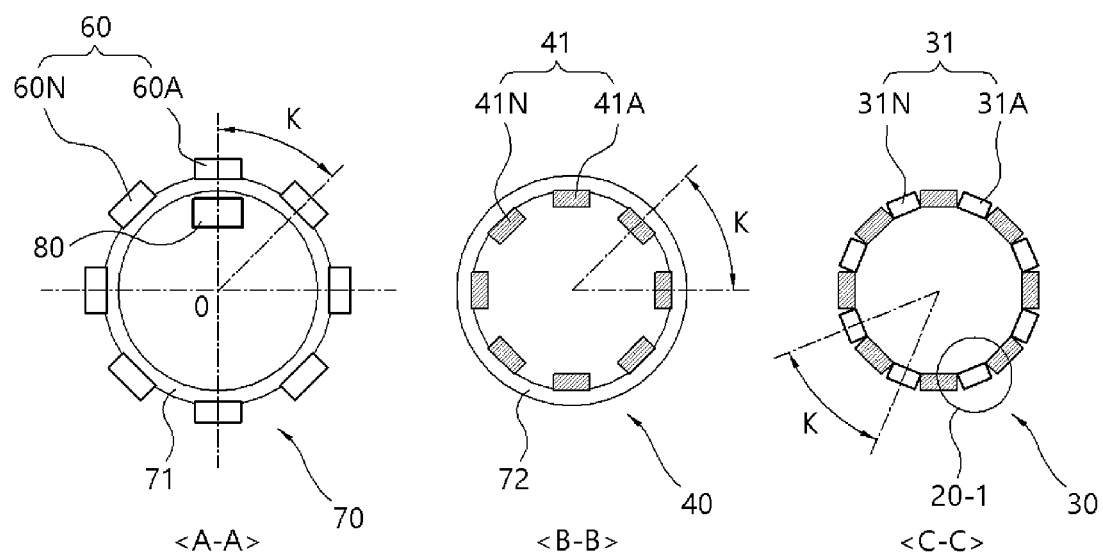

FIG.11
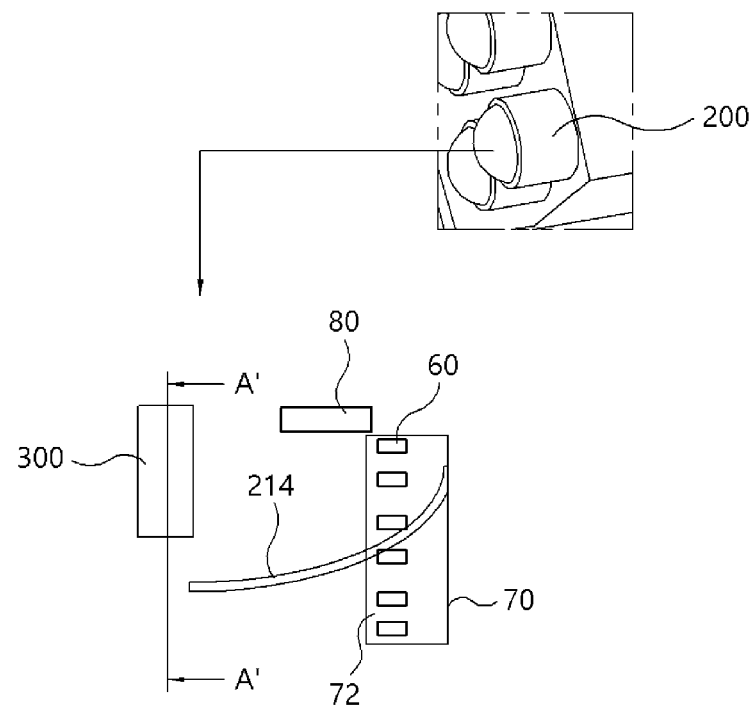
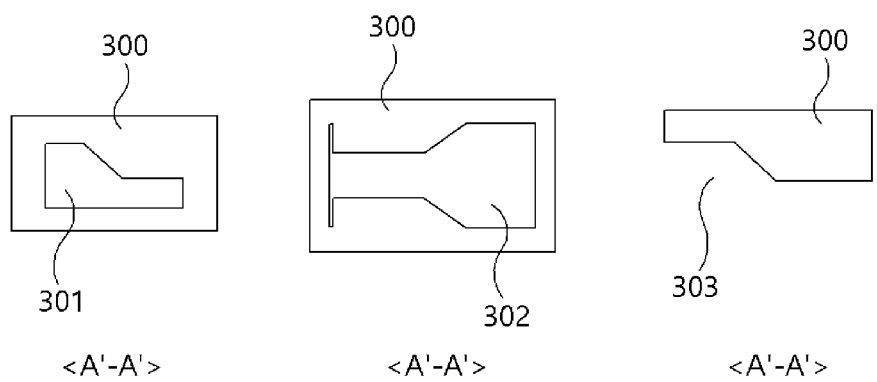

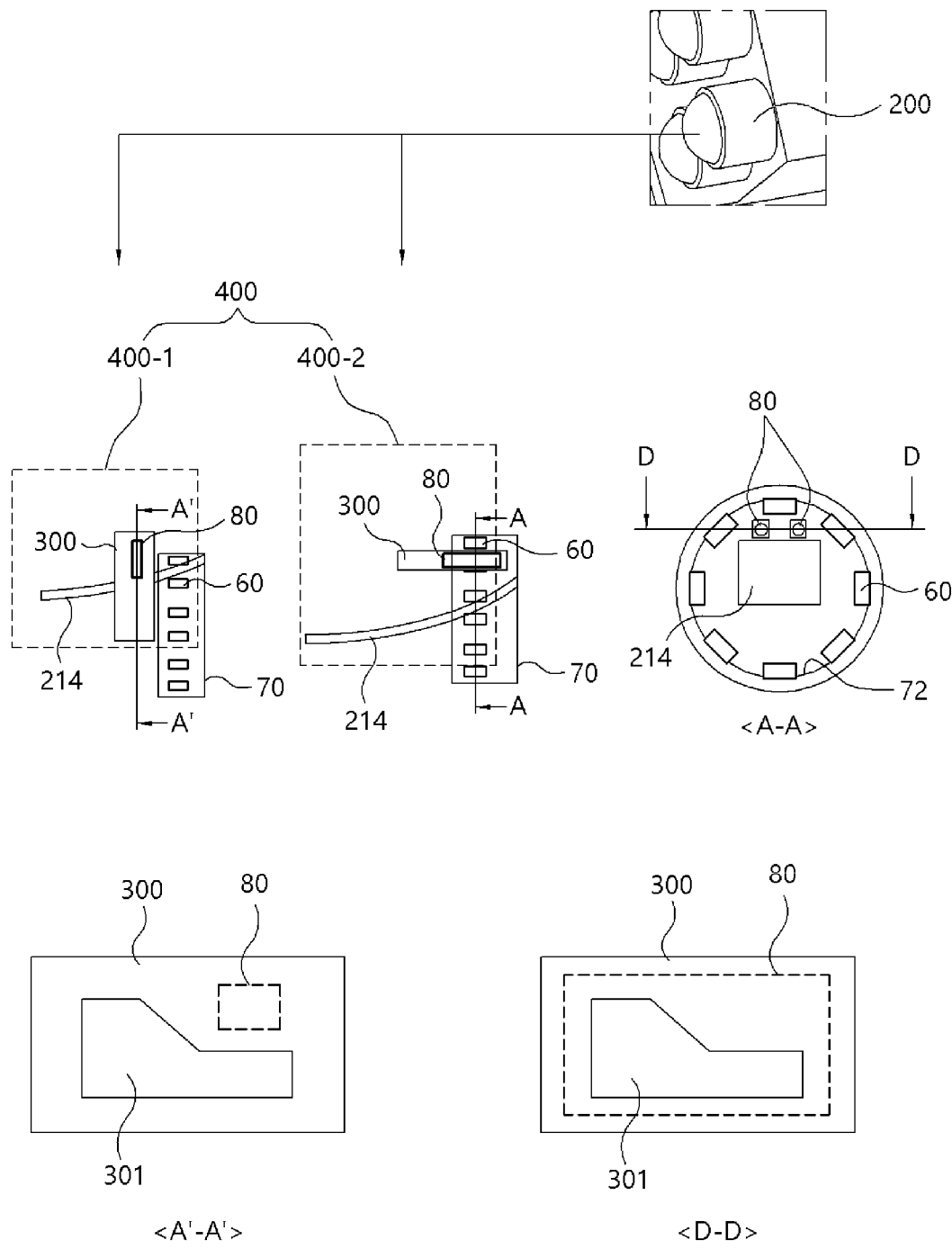

ROTATION LIGHT SOURCE DEVICE AND LAMP SYSTEM THEREOF

CROSS-REFERENCE TO RELATED APPLICATION

This application claims the benefit of priority to Korean Patent Application No. 10-2021-0058473, filed on May 6, 2021 in the Korean Intellectual Property Office, the entire contents of which is incorporated herein by reference.

TECHNICAL FIELD

The present disclosure relates to a lamp, and particularly, to a lamp system to which a position synchronization type rotation light source device is applied, which rotates a plurality of LED chip arrays such that an LED chip reaching a synchronized rotation position is turned on, thereby minimizing the number of light-emitted LEDs.

BACKGROUND

Generally, a light emitting diode (LED) applied as a light source for vehicle lamps is composed of an LED chip (or chip LED). In this case, the LED chip is referred to as an LED for generating light when being electrically conducted by a principle of a PN junction light-emitting diode.

As an example, the LED chip light source lamp may have the advantage of enhancing light source efficiency by miniaturization of the LED and enhance the focus of a reflection surface of the lamp and a light concentration factor at an LED chip position as the LED chip becomes small, thereby having the advantage of enabling efficient use of light.

Particularly, the LED chip light source lamp is implemented by the LED chip array using a plurality of LED chips, thereby directly implementing various beam patterns by selectively turning on the plurality of LED chips, and as a result, may be effectively used to implement various beam patterns in the lamp for the vehicle.

Further, the LED chip array is also advantageous in generating a high light amount of about 2000 lm required for the lamp for the vehicle because it combines a single LED chip having a limited light amount into multiple LED chips.

However, the LED chip array inevitably has the limitation in that it is disadvantageous in terms of an increase in the light amount, an optical loss, and guarantee for an LED performance.

First, in terms of the increase in the light amount of the LED light source, there inevitably occur an increase in the layout due to an increase in the number of chips, such as 1, 2, 3, 4, or 5 chips, a decrease in the light amount due to thermal concentration, and an increase in an amount of properties changed, such as an amount of temperature changed and an amount of voltage changed.

Second, in terms of the optical loss for condensation of the plurality of LED light sources, there inevitably occur a decrease in reflection efficiency due to reflection of a reflection surface for condensation (e.g., occurrence of the decrease by 1 to 50% according to the degree of deposition) and a decrease in transmission efficiency due to non-spherical lens transmission (e.g., occurrence of the decrease by 5 to 30% according to a material and a thickness).

Third, in terms of the LED performance guarantee range, the color conversion, a change in a voltage, and light loss due to a decrease in the LED characteristics occurring as more chips are constituted make the LED guarantee range different, and in the case of preventing such a problem by enhancing the condensation efficiency by the plurality of reflection surfaces, there inevitably occurs loss of optical efficiency due to the reflection and the transmission.

The contents described in Description of Related Art are to help the understanding of the background of the present disclosure, and may include what is not previously known to those skilled in the art to which the present disclosure pertains.

SUMMARY OF THE DISCLOSURE

Therefore, an object of the present disclosure considering the above point is to provide a position synchronization type rotation light source device and a lamp system thereof, which generate a light source by a specific LED whose signal is synchronized at a predetermined position while rotating a plurality of LED chips arranged circularly, thereby eliminating all problems such as an increase in a layout/a decrease in a light amount/an increase in an amount of properties changed, a decrease in reflection efficiency/transmission efficiency, and loss of optical efficiency which occur in an LED array structure including a plurality of LEDs, and particularly, generating various lighting patterns in combination with a digital micromirror display (DMD) and a shield with a cutoff shape even while simplifying an internal structure even in combination with optical elements of reflector/aspherical lens/low-pressure injection lens.

A rotation light source device according to one embodiment of the present disclosure for achieving the object is characterized by including a rotation mechanism for receiving a rotation force of a power source, an LED circuit unit including a plurality of LED chips and rotatable by the rotation mechanism, the plurality of LED chips including first to Nth LED chips, where N is an integer of 2 or more; and a signal transmitter for transmitting a transmission signal to the LED circuit unit such that light is generated by a specific LED chip synchronized at a turn-on position of the first to Nth LED chips per one rotation while the first to Nth LED chips rotate together with the LED circuit unit.

As a preferred exemplary embodiment, the signal transmitter classifies the transmission signal into a synchronization signal for a position and a current application signal for turn-on; and is constituted to simultaneously transmit the current application signal for supplying a power source together with the synchronization signal for the LED chip reaching the turn-on position of the first to Nth LED chips to the LED circuit unit or to transmit the synchronization signal for the LED chip reaching the turn-on position of the first to Nth LED chips to the LED circuit unit and then separately transmit the current application signal for supplying the power source to the LED circuit unit.

As the preferred exemplary embodiment, the rotation mechanism includes a rotation force transmitter rotated by the power source, and a rotation force receiver fixed to the LED circuit unit and coaxially connected to the rotation force transmitter to deliver a rotation force.

As the preferred exemplary embodiment, the rotation force transmitter and the rotation force receiver have a shape of a hollow cylinder to form a coupling section delivering the rotation force, and the coupling section includes any one of a circular rotation section in which some portions of the rotation force transmitter and some portions of the rotation force receiver are circularly coupled, a concentric rotation section in which some portions of the rotation force transmitter and some portions of the rotation force receiver overlap in an axial direction of the rotation force transmitter or the rotation force receiver, and an intersecting concentric rotation section in which some portions of the rotation force transmitter and some portions of the rotation force receiver overlap in the axis direction to form a concentric circle and some portions of a power receiver are adjacent to some portions of the rotation force transmitter to form a circle.

As the preferred exemplary embodiment, the circular rotation section has the rotation force transmitter including first to Nth insertion legs, and the rotation force receiver including first to Nth fixing legs to be adjacent to each other to form a circle.

As the preferred exemplary embodiment, the concentric rotation section has the rotation force transmitter including a plurality of stators, and the rotation force receiver including a plurality of permanent magnets to form a concentric circle with respect to the rotation force transmitter.

As the preferred exemplary embodiment, the intersecting concentric rotation section has the rotation force receiver including a plurality of permanent magnets, and the power receiver including first to Nth power reception legs to form an adjacent circle with respect to each other, and has the rotation force transmitter including a plurality of stators to form a concentric circle with respect to the rotation force receiver and the power receiver.

As the preferred exemplary embodiment, the power receiver generates power by electromagnetic force induction with the rotation force transmitter, and the power is supplied to the first to Nth LED chips as a current to substitute the current application signal transmitted by the signal transmitter.

As the preferred exemplary embodiment, the first to Nth LED chips are configured in an LED combination of a YELLOW LED, a RED LED, a BLUE LED, and a GREEN LED, and the LED combination implements any one of a WHITE color lighting of the YELLOW LED and the BLUE LED, a WHITE color lighting of the BLUE LED and the GREEN LED, or an AMBER color lighting of the GREEN LED, the YELLOW LED, and the RED LED.

As the preferred exemplary embodiment, the first to Nth LED chips are disposed on any one of an outer circumference, an inner circumference, a front flat plate, a front convex cone, or a front concave cone of the LED circuit unit.

As the preferred exemplary embodiment, the first to Nth LED chips illuminate light from the outer circumference of the LED circuit unit to an outside of the LED circuit unit, and condenses the light from the inner circumference thereof to an inside of the LED circuit unit.

As the preferred exemplary embodiment, the first to Nth LED chips match an optical axis of the LED circuit unit with a rotation axis of the rotation mechanism on the front flat plate.

As the preferred exemplary embodiment, the first to Nth LED chips tilt the light upwardly with respect to the LED circuit unit on the front convex cone, and the first to Nth LED chips tilt the light downward with respect to the LED circuit unit on the front concave cone.

As the preferred exemplary embodiment, the signal receiver forms synchronization with an LED reaching a turn-on position of the first to Nth LED chips at any one position of an outer circumference, an inner circumference, a front flat plate, a front convex cone, or a front concave cone of the LED circuit unit.

Further, a lamp system according to another embodiment of the present disclosure for achieving the object is characterized by including a rotation light source device for turning on an LED by simultaneously generating or separately generating a synchronization signal and a current application signal for the LED reaching a synchronized rotation position of first to Nth LED chips (N is an integer of 2 or more) per one rotation while being rotated by a current applied by receiving a lamp turn-on signal of a vehicle from a signal transmitter, in which any one of a reflector, an optical member, or a digital micromirror display (DMD) is positioned in the first to Nth LED chips to condense the light.

As a preferred exemplary embodiment, the reflector condenses the light on outer portions of the first to Nth LED chips.

As the preferred exemplary embodiment, the reflector condenses the light on inner portions or front portions of the first to Nth LED chips or condenses the light on front portions of the first to Nth LED chips at an upwardly tilted angle or a downwardly titled angle.

As the preferred exemplary embodiment, the optical member and the DMD condense the light on front portions of the first to Nth LED chips, and the optical member is any one of an asymmetric lens, a low pressure injection lens, or a light guide.

As the preferred exemplary embodiment, the reflector is combined with a shield, and the shield changes a lighting pattern by the light into a cutoff shape perforated in the shield in a symmetric or asymmetric shape.

As the preferred exemplary embodiment, the shield is integrated with the signal transmitter, and the shield is separated from the reflector or coupled to and integrated with a protrusion horizontally formed on one edge of the reflector.

A lamp system to which the position synchronization type rotation light source device according to the present disclosure is applied implements the following operations and effects.

First, by condensing the light of the specific LED turned on at the synchronized rotation position of the plurality of LED chips arranged circularly, it is possible to enhance the optical efficiency even without using the separate device for reflection/refraction/transmission.

Second, by substituting the LED with the specific LED in which the LED at another position is quickly synchronized and turned on after boosting (i.e., voltage up) and turning on the substituted LED, it is possible to make the high light amount with less power consumption due to the increase in the use rate of the LED, and to increase the life expectancy of the LED even upon boosting using the substituted LED for only a short time by substituting the LED, and by quickly decreasing the junction temperature by adding the cooling effect of the ambient temperature decreased by the change in the movement by the rotation with respect to the LED turned off by the change in the position by the rotation, it is possible to improve the optical characteristics (e.g., a light amount, a chromaticity, and a light conversion rate).

Third, by condensing the single LED chip with the small light focus, it is possible to make the clear cutoff and to decrease the size of the lamp.

Fourth, by applying the shield forming the cutoff line capable of preventing the glare from the opposing vehicle and the preceding vehicle to the single LED chip of the small light source, it is possible to control the light more accurately and to prevent the glare from the low-altitude vehicle with the shape of the downward cutoff line required for the lamp of the urban air mobility (UAM).

Fifth, by forming the highest light amount of LED at the right position of the shield, it is possible to prevent the flicker, and by matching the center of the shield with the generation of the maximum magnetic field of the magnetic field generator, it is possible to secure the remote performance with the power source supplied through the power conversion.

Sixth, by decreasing the size of the low pressure injection lens, such as the light guide, which is the optical element of the lamp, due to the small focus of the LED light source, it is possible to decrease the weight/cost of the low pressure injection lens.

BRIEF DESCRIPTION OF THE DRAWINGS

FIG. 1 is a diagram illustrating a configuration of a position synchronization type rotation light source device according to the present disclosure.

FIG. 11 is a diagram illustrating an example in which the lamp system according to the present disclosure is constituted by applying a shield together with the rotation light source device.

FIG. 12 is a diagram illustrating an example in which the lamp system according to the present disclosure is constituted by applying an optical shield module together with the rotation light source device.

DESCRIPTION OF SPECIFIC EMBODIMENTS

Figure 2:
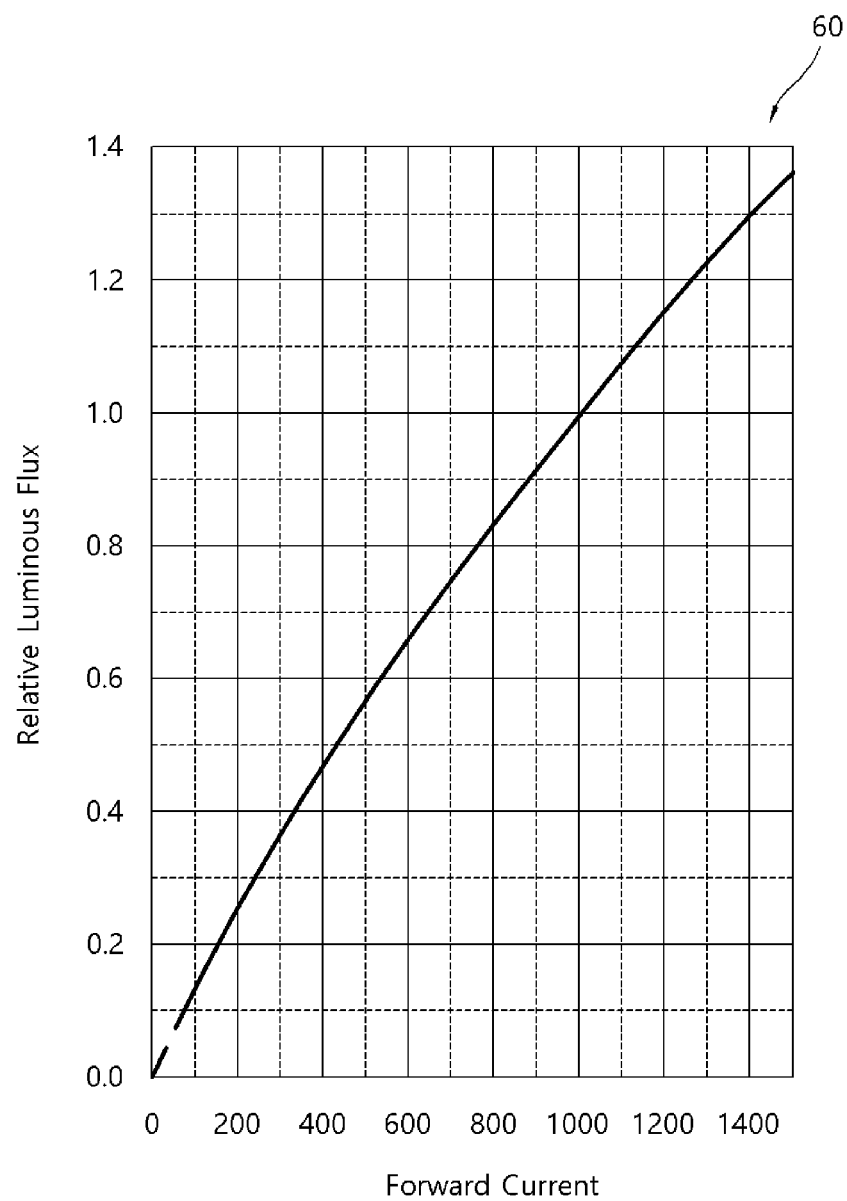
FIG. 2 is a diagram illustrating an example of a current and light amount graph of an LED of an LED chip according to the present disclosure.

Hereinafter, an exemplary embodiment of the present disclosure will be described in detail with reference to accompanying exemplary drawings, and the exemplary embodiment is illustrative and may be implemented by those skilled in the art to which the present disclosure pertains in various different forms, and thus is not limited to the exemplary embodiment described herein.

Referring to FIG. 1, a rotation light source device 1 includes a power source 10, a rotation mechanism 20, an LED module 50, and a signal transmitter 80. In this case, the rotation light source device 1 is characterized by a position synchronization type rotation light source device.

Hereinafter, the number of first, . . . , Nth insertion legs 31A to 31N of a rotation force transmitter 30, the number of first, . . . , Nth fixing legs 41A to 41N of a rotation force receiver 40, and the number of first, . . . , Nth LED chips 60A to 60N of an LED chip 60 are exemplarily 8 in total, but they are illustrative, such that the number thereof may be modified small or large.

As an example, the power source 10 applies a motor and rotates the rotation mechanism 20. To this end, the power source 10 forms an assembly structure or an integral structure with the rotation force transmitter 30 to rotate the rotation force transmitter 30 of the rotation mechanism 20. In this case, the power source 10 is constituted to form the signal transmitter 80 and an electric circuit (not illustrated) for power source supply and driving.

As an example, the rotation mechanism 20 is rotated by the power source 10 to rotate the LED module 50. To this end, the rotation mechanism 20 is composed of the rotation force transmitter 30 and the rotation force receiver 40.

In a section C-C, the rotation force transmitter 30 forms a hollow cylindrical structure by the insertion leg 31, and the insertion leg 31 is composed of the plurality of first, . . . , Nth insertion legs 31A to 31N (N is an integer of 2 or more) having a separation interval between neighboring legs to form a circular section.

In a section B-B, the rotation force receiver 40 forms a hollow cylindrical structure by the fixing leg 41, and the fixing leg 41 is composed of the plurality of first, . . . , Nth fixing legs 41A to 41N (N is an integer of 2 or more) having an interval therebetween to form a circular section.

Therefore, the rotation force transmitter 30 and the rotation force receiver 40 form an assembly state where the insertion leg 31 of the rotation force transmitter 30 and the fixing leg 41 of the rotation force receiver 40 are coaxially arranged, and form a matching state (see the section C-C) where the first, . . . , Nth insertion legs 31A to 31N of the insertion leg 31 and the first, . . . , Nth fixing legs 41A to 41N of the fixing leg 41 are fitted and positioned between the separation intervals in some sections of the entire length, thereby forming a circular rotation section 20-1.

Therefore, the circular rotation section 20-1 delivers the rotation of the rotation force transmitter 30 by the power source 10 to the rotation force receiver 40, such that an LED circuit unit 70 of the LED module 50 integrated by fixing one edge of the rotation force receiver 40 may be rotated.

Figure 3:
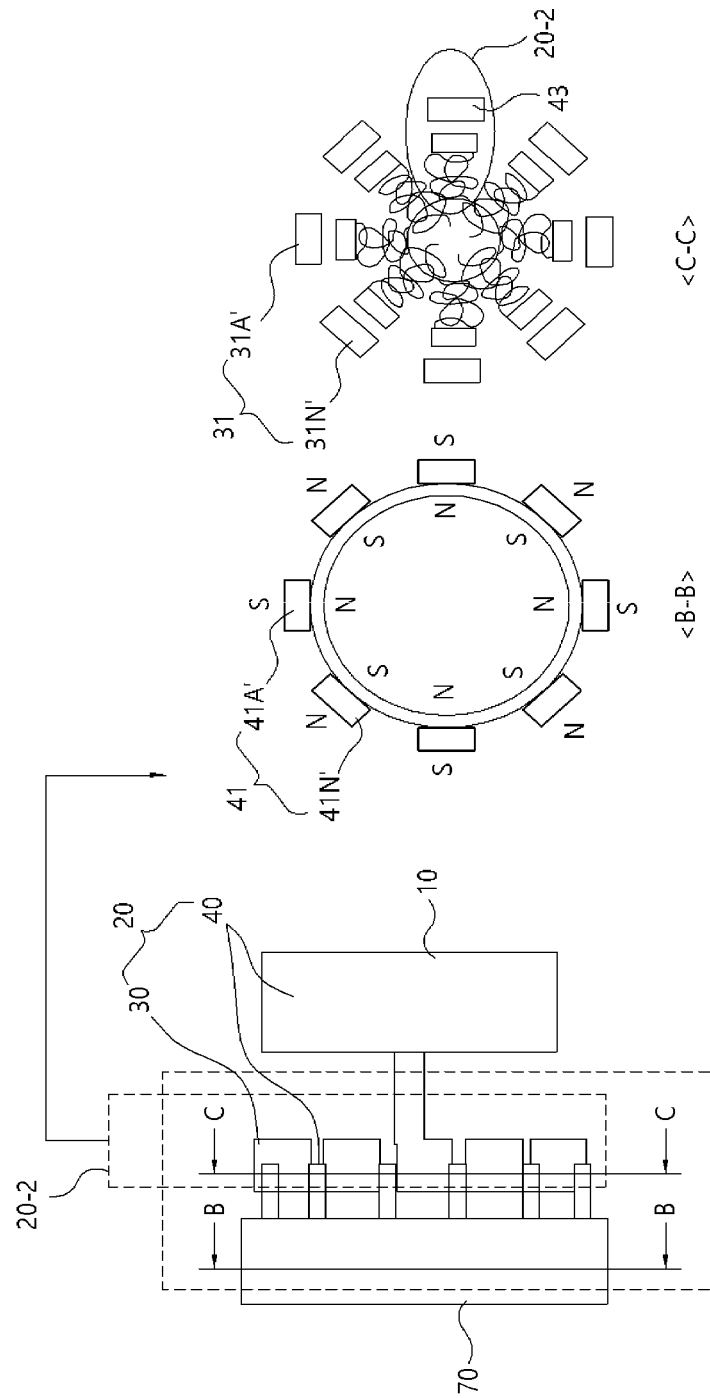
FIG. 3 is a diagram illustrating an example in which a rotation mechanism of the rotation light source device according to the present disclosure modifies a circular rotation section into a concentric rotation section using a motor method.
Figure 4:
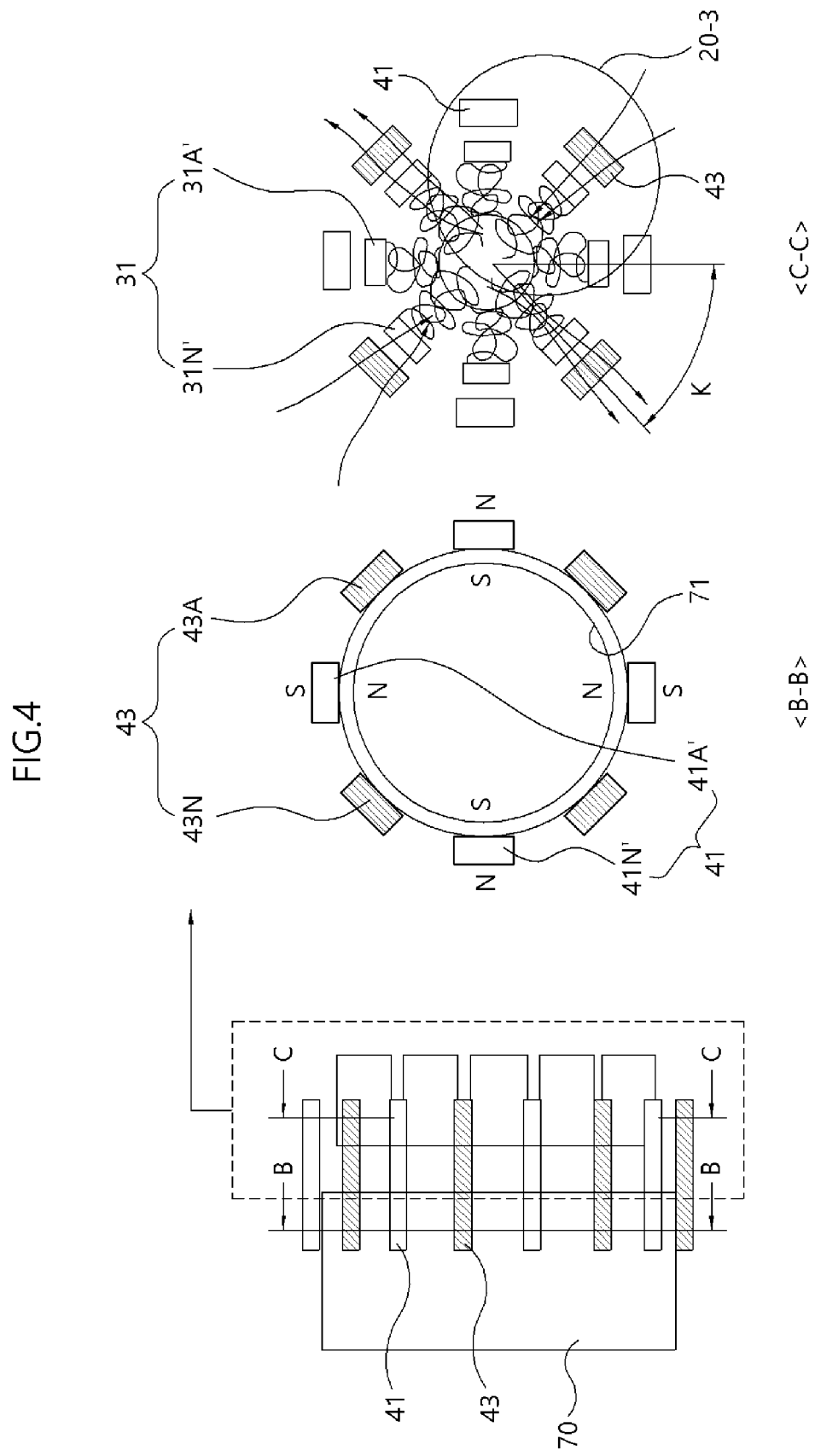
FIG. 4 is a diagram illustrating an example in which the rotation mechanism of the rotation light source device according to the present disclosure modifies the circular rotation section into an intersecting concentric rotation section generating power using an induction coil principle together with the motor method.

As described above, the rotation force transmitter 30 and the rotation force receiver 40 are formed of a hollow cylinder to form a coupling section by the circular rotation section 20-1 delivering the rotation force, and the coupling section may be modified into a concentric rotation section 20-2 (see FIG. 3) or an intersecting concentric rotation section 20-3 (see FIG. 4).

As an example, the LED module 50 is composed of the LED chip 60 and the LED circuit unit 70.

In a section A-A, the LED circuit unit 70 is formed of a hollow cylinder structure having a circular section, and the LED chip 60 is attached to an outer diameter 71 of the LED circuit unit 70 and connected to an electric circuit of the LED circuit unit 70. In this case, the first, . . . , Nth LED chips 60A to 60N of the LED chip 60 are composed of an external array layout.

To this end, the LED chip 60 is composed of the first, . . . , Nth LED chips 60A to 60N (N is an integer of 2 or more), and each of the first, . . . , Nth LED chips 60A to 60N has a separation interval between neighboring LED chips and is attached to the outer diameter 71 of the LED circuit unit 70. Since the LED circuit unit 70 is manufactured by using a printed circuit board (PCB), the LED circuit unit 70 has electric circuits embedded therein for supplying a power source and transmitting/receiving a signal, and the electric circuit of the PCB includes a power source and a signal circuit for generating a synchronization signal with the signal transmitted by the signal transmitter 80.

Furthermore, referring to the sections A-A, B-B, and C-C, the first, . . . , Nth insertion legs 31A to 31N of the rotation force transmitter 30, the first, . . . , Nth fixing legs 41A to 41N of the rotation force receiver 40, and the first, . . . , Nth LED chips 60A to 60N of the LED chip 60 equally form separation interval formation angles (K), and the sameness of the separation interval formation angles (K) provides the consistence of the rotation angles for each other.

In this case, the separation interval formation angle (K) is formed at about 45°, but may be set as a 30° smaller than that or a 60° larger than that, which is changed according to the number of LED chips.

As an example, the signal transmitter 80 is positioned to be perpendicular to a center (0) of the circular section from an internal space of the LED circuit unit 70 (i.e., an inner diameter 72 of the LED circuit unit 70 (see FIG. 5)) to the inside of the LED circuit unit 70, such that a current is applied to the corresponding LED by the power source connected in a state of being synchronized with one or more LED chips facing each other of the first, . . . , Nth LED chips 60A to 60N of the LED chip 60.

In this case, since the signal transmitter 80 is manufactured by using the printed circuit board (PCB), the signal transmitter 80 has electric circuits embedded therein for supplying a power source and transmitting a signal for receiving the signal (i.e., lamp controller) transmitted from the outside to transmit the signal to the LED circuit unit 70.

To this end, the signal transmitter 80 is formed in a bar shape of a predetermined length provided with a power source line and a signal line therein, and may be coupled to a housing (not illustrated) or a reception connector (not illustrated) of the rotation light source device 1 or a lamp housing (not illustrated) of the lamp system (see FIG. 8) to form a fixed state.

Particularly, the signal transmitter 80 generates a transmission signal, including a power source (or power) and a synchronization signal divided from a signal received from the outside, and synchronizes specific LED chips at a position facing each other of the first, . . . , Nth LED chips 60A to 60N through the LED circuit unit 70 by receiving the synchronization signal while connecting the power to the power source 10, the LED chip 60, and the LED circuit unit 70 by the power source signal by receiving the power source of control signals of a controller or an operation button (not illustrated), such that the power may be applied to the corresponding LED. In this case, since the specific LED chips at the position facing each other may be one or more of the first, . . . , Nth LED chips 60A to 60N, the number of the specific LED chips or LEDs turned on at the synchronized rotation position may be 1 or 2 or more.

Therefore, the signal transmitter 80 synchronizes and turns on the specific LED chips facing each other of the first, . . . , Nth LED chips 60A to 60N of the LED chip 60 per one rotation with respect to the rotation of the LED circuit unit 70 of the LED module 50 rotated by the rotation force receiver 40 of the rotation mechanism 20, such that the light of the LED light source is generated.

Particularly, as may be seen from the LED current and light amount graph illustrated in FIG. 2, the signal transmitter 80 uses the characteristics of the first, . . . , Nth LED chips 60A to 60N in which the light amount also increases as the application current increases, and as a result, it is possible to implement a short turn-on time by applying a high current to the LED chip or the LED turned on at the synchronized rotation position, thereby implementing an operation control in a method for using any one of the first, . . . , Nth LED chips 60A to 60N for a short time and then using another one again.

Therefore, the rotation light source device 1 may implement the features in which each of the first, . . . , Nth LED chips 60A to 60N may increase optical efficiency using the characteristics in which the light amount increases due to the increase in the current in the same condition, a separate condensation structure for condensing the light of the LED light source may be deleted by the increase in the optical efficiency, and the size of the light focus may be decreased by deleting the condensation structure.

FIGS. 3 and 4 illustrate modified examples of the rotation mechanism 20.

Referring to FIG. 3, the rotation mechanism 20 is composed of the rotation force transmitter 30 and the rotation force receiver 40, and there is a difference in that the insertion leg 31 of the rotation force transmitter 30 is composed of first, . . . , Nth stators 31A' to 31N' (N' is an integer of 2 or more) unlike the first, . . . , Nth insertion legs 31A to 31N illustrated in FIG. 1 and the fixing leg 41 of the rotation force receiver 40 is composed of first, . . . , Nth permanent magnets 41A' to 41N' (N' is an integer of 2 or more) unlike the first, . . . , Nth fixing legs 41A to 41N illustrated in FIG. 1.

Therefore, the first, . . . , Nth stators 31A' to 31N' of the rotation force transmitter 30 and the first, . . . , Nth permanent magnets 41A' to 41N' of the rotation force receiver 40 coaxially form a concentric assembly state, and the concentric assembly state forms the concentric state (see the section C-C) where the first, . . . , Nth stators 31A' to 31N' form an inner circle and the first, . . . , Nth permanent magnets 41A' to 41N' form an outer circle in some sections of the entire length, thereby forming the concentric rotation section 20-2.

Further, in the concentric rotation section 20-2, the rotation force transmitter 30 and the rotation force receiver 40 may be rotated in a BLDC motor method for converting the rotation forces of the first, . . . , Nth stators 31A' to 31N' by the power source 10 into the rotation forces of the first, . . . , Nth permanent magnets 41A' to 41N' surrounding the first, . . . , Nth stators 31A' to 31N', and as a result, the LED circuit unit 70 may be rotated.

Therefore, when applying the concentric rotation section 20-2, the rotation light source device 1 implements the power source 10 and the rotation mechanism 20 in the BLDC motor method, such that the power source 10 and the rotation mechanism 20 may be substituted with one integrated BLDC motor. In this case, the DC motor may also be applied in the same method as the BLDC motor method integrating the power source 10 and the rotation mechanism 20 into one.

FIG. 4 illustrates that the rotation mechanism 20 is composed of the rotation force transmitter 30, the rotation force receiver 40, and a power receiver 43.

As an example, as illustrated in FIG. 3, the rotation mechanism 20 has the rotation force transmitter 30 composed of the first, ..., Nth stators 31A' to 31N' and the rotation force receiver 40 composed of the first, ..., Nth permanent magnets 41A' to 41N' so as to form the concentric rotation section 20-2 in the BLDC motor method, in which there is a difference in that the number of first, ..., Nth stators 31A' to 31N' remains the same whereas the number of first, ..., Nth permanent magnets 41A' to 41N' is reduced by ½ compared to in FIG. 3 and the permanent magnets are substituted with the power receiver 43 by the difference in number.

To this end, a plurality of first, ..., Nth power reception legs 43A to 43N (N is an integer of 2 or more) constituting the power receiver 43 are positioned as one power reception leg between two neighboring permanent magnets of the first, ..., Nth permanent magnets 41A' to 41N' to form an outer circle surrounding the first, ..., Nth stators 31A' to 31N' together with the first, ..., Nth permanent magnets 41A' to 41N' to form the intersecting concentric rotation section 20-3.

Therefore, the number of first, ..., Nth stators 31A' to 31N' is the same as the number obtained by summing the number of first, ..., Nth permanent magnets 41A' to 41N' and the number of first, ..., Nth power reception legs 43A to 43N.

Therefore, in the intersecting concentric rotation section 20-3, the first, ..., Nth power reception legs 43A to 43N may partially substitute the first, ..., Nth permanent magnets 41A' to 41N' with induction coils of the first, ..., Nth stators 31A' to 31N' to receive a power source through the conversion of the rotation force→the magnetic force→power from a change in the magnetic force due to the rotation forces of the first, ..., Nth stators 31A' to 31N'.

Therefore, when applying the intersecting concentric rotation section 20-3, the rotation light source device 1 may supply the power of the power receiver 43 to each of the first, ..., Nth LED chips 60A to 60N through the LED circuit unit 70 even while substituting the power source 10 and the rotation mechanism 20 with one BLDC motor, and such a method for producing and supplying the power in itself may implement the advantage capable of deleting an external power source-connected configuration even while simplifying the structure because the signal transmitter 80 is operated by only the reception function of the synchronization signal without power source supply function.

Figure 5:
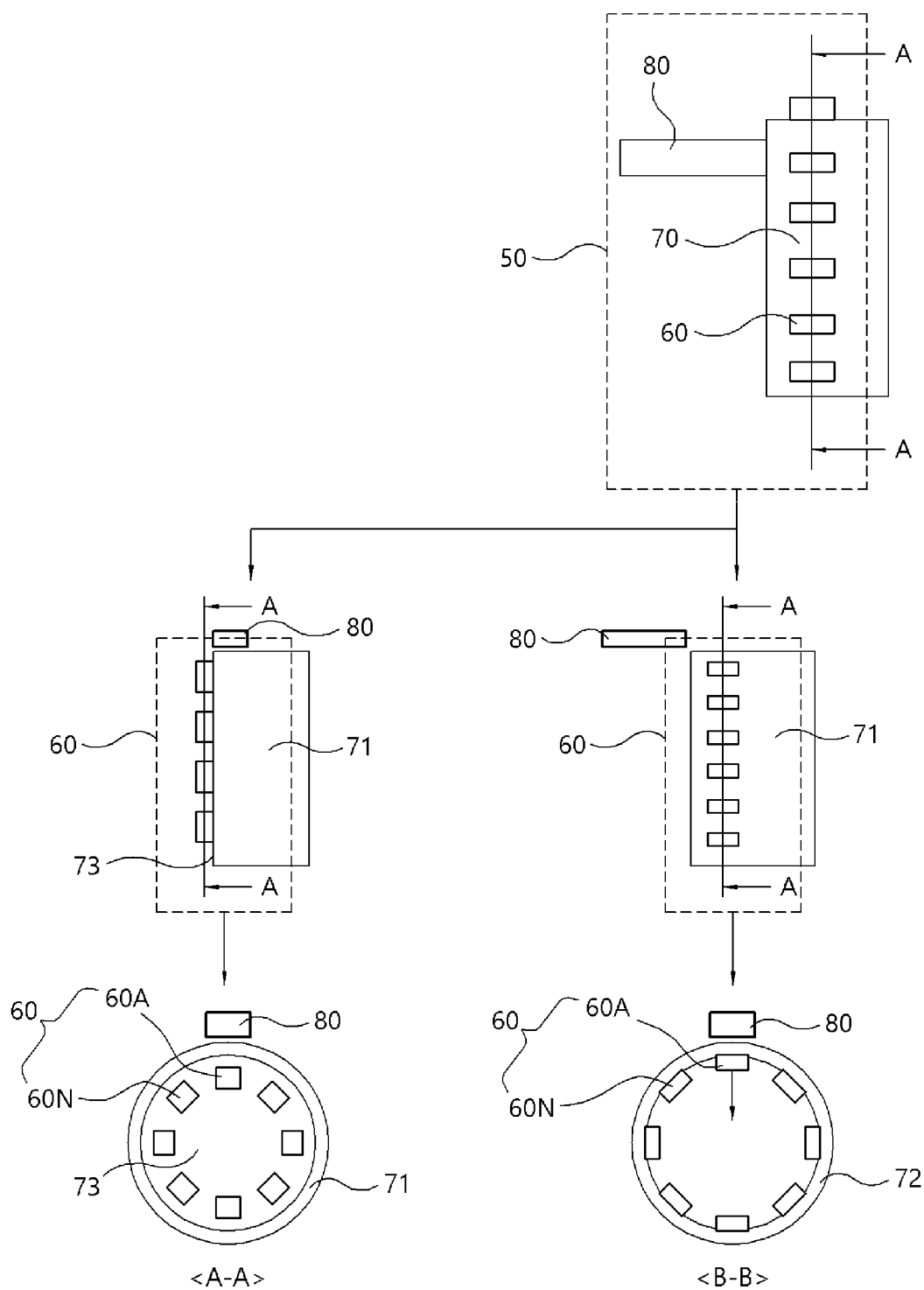
FIG. 5 is a diagram illustrating an example of modifying installation places of a plurality of LED chips constituting an LED module of the rotation light source device according to the present disclosure.
Figure 6:
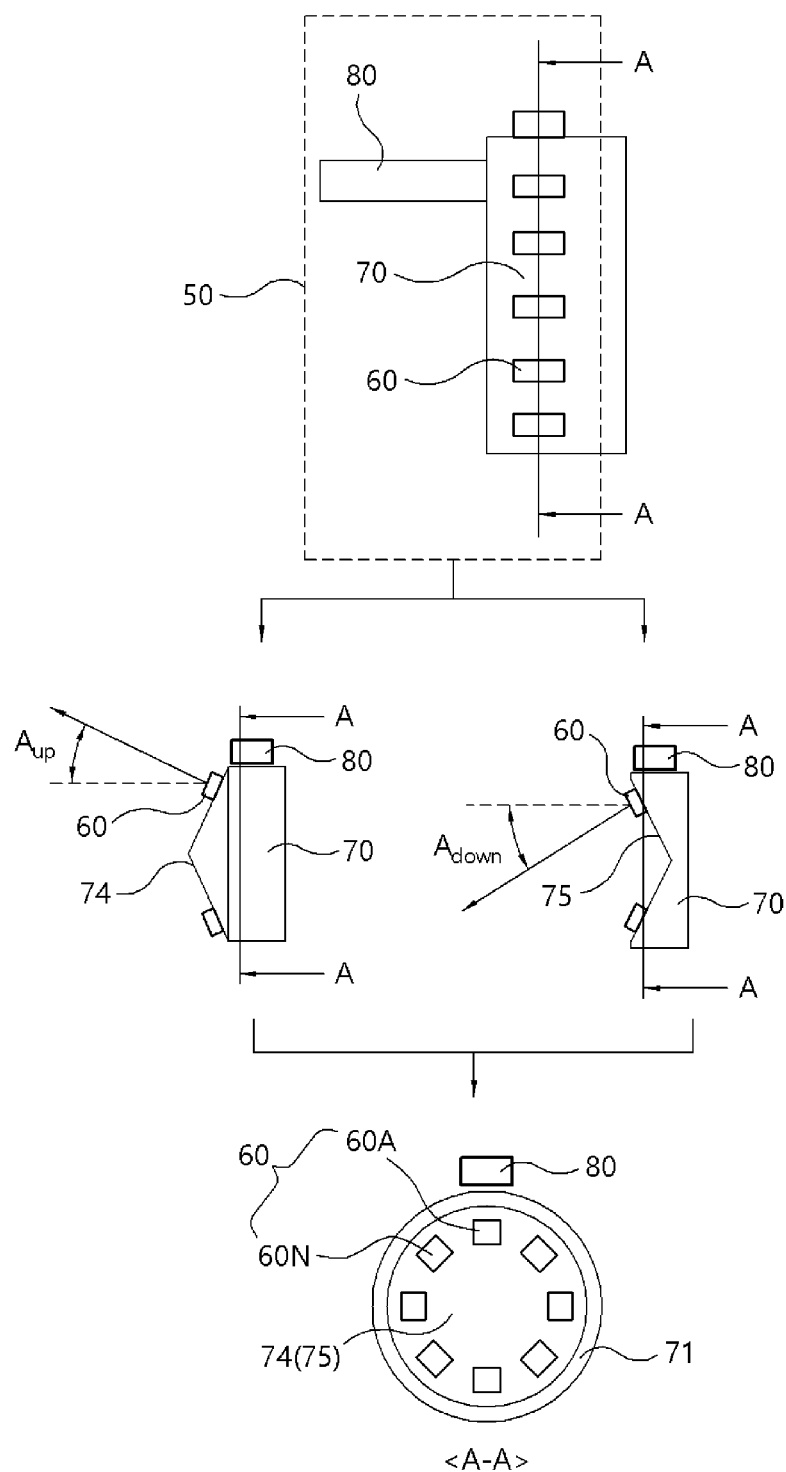
FIG. 6 is a diagram illustrating an example of modifying installation angles of the plurality of LED chips constituting the LED module of the rotation light source device according to the present disclosure.

FIGS. 5 and 6 illustrate various modified examples of the array layout for the first, ..., Nth LED chips 60A to 60N of the LED chip 60 in the LED module 50.

Referring to FIG. 5, the LED chip 60 may apply an internal array layout or a front coaxial array layout. In this case, the signal transmitter 80 is positioned to be perpendicular to the center (0) (see FIG. 1) of the circular section from the outer diameter 71 of the LED circuit unit 70 to the outside of the LED circuit unit 70, such that a current is applied to the corresponding LED by the power source connected in the state of being synchronized with one or more LED chips facing each other of the first, ..., Nth LED chips 60A to 60N of the LED chip 60.

As an example, in the internal array layout, the LED chip 60 attaches the first, ..., Nth LED chips 60A to 60N to the inner diameter 72 of the LED circuit unit 70 at the separation interval formation angles (K) (see FIG. 1), thereby condensing the light of the LED light source illuminated to the inside of the LED circuit unit 70 in the inner diameter 72.

As an example, in the front coaxial array layout, the LED chip 60 attaches the first, ..., Nth LED chips 60A to 60N to a front flat plate 73 of the LED circuit unit 70 at the separation interval formation angles (K) (see FIG. 1), thereby illuminating the light of the LED light source to the front of a rotation axis (i.e., the power source or the rotation mechanism) by matching an optical axis with the rotation axis. In this case, the front flat plate 73 is formed of a circular plate to block one portion of the circular section of the LED circuit unit 70, and may be manufactured in an integral structure or manufactured in a bonding coupling structure.

Therefore, the LED chip 60 uses the front coaxial array layout such that each of the first, ..., Nth LED chips 60A to 60N faces the front, thereby being constituted to be parallel with the rotation direction of the rotation mechanism 20, such that the optical axis and the rotation axis may be matched.

Referring to FIG. 6, the LED chip 60 may apply an upward array layout or a downward array layout.

As an example, in the upward array layout, the LED chip 60 attaches the first, ..., Nth LED chips 60A to 60N to a front convex cone 74 protruding from one edge of the LED circuit unit 70 to the outside at the separation interval formation angles (K) (see FIG. 1), and an upward cone tilted angle ($A_{up}$) of the front convex cone 74 tilts each of the first, ..., Nth LED chips 60A to 60N upwardly to have a certain angle to the outside of the LED circuit unit 70 with respect to the rotation direction, thereby being constituted to condense or spread the light of the LED light source.

As an example, in the downward array layout, the LED chip 60 attaches the first, ..., Nth LED chips 60A to 60N to a front concave cone 75 protruding from one edge of the LED circuit unit 70 to the inside at the separation interval formation angles (K) (see FIG. 1), and an downward cone tilted angle ($A_{down}$) of the front concave cone 75 tilts each of the first, ..., Nth LED chips 60A to 60N downwardly to have a certain angle to the inside of the LED circuit unit 70 with respect to the rotation direction, thereby being constituted to condense or spread the light of the LED light source.

As an example, each of the front convex cone 74 and the front concave cone 75 is formed of a cone to block one portion of the circular section of the LED circuit unit 70, and may be manufactured in the integral structure or manufactured in the bonding coupling structure.

Figure 7:
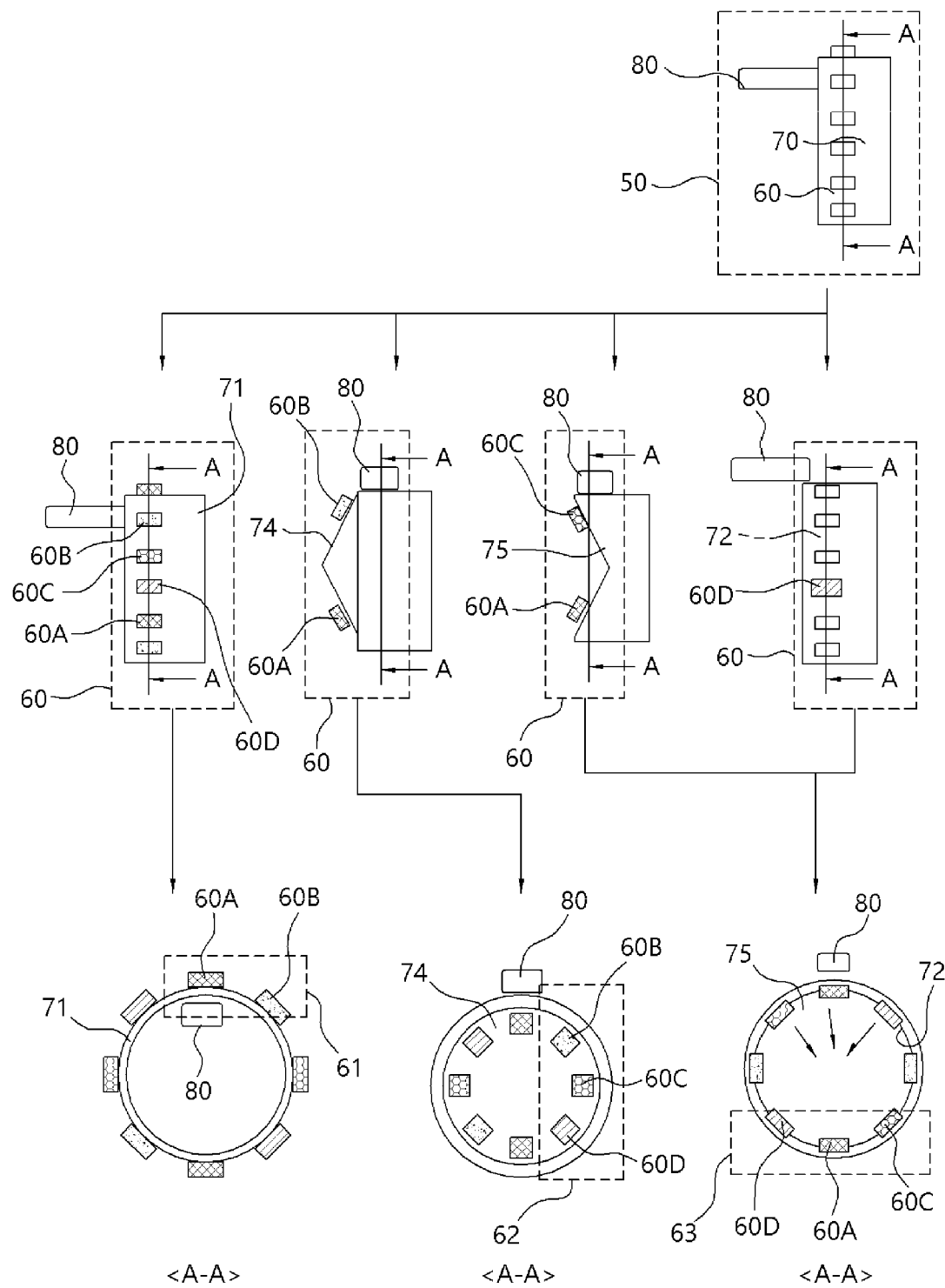
FIG. 7 is a diagram illustrating an example of color combinations of the plurality of LED chips constituting the LED module of the rotation light source device according to the present disclosure.

FIG. 7 illustrates an example in which the LED chip 60 implements various LED color combinations implemented by the first, ..., Nth LED chips 60A to 60N by first, second, and third LED chip combinations 61, 62, and 63.

As illustrated, it is exemplified as a case where a first LED chip combination 61 of the first, second, and third LED chip combinations 61, 62, and 63 is applied to the external array layout (see FIG. 1) of the LED chip 60, a second LED chip combination 62 is applied to the upward array layout (see FIG. 6), and a third LED chip combination 63 is applied to the internal array layout (see FIG. 5)/the downward array layout (see FIG. 6). However, application targets of the first, second, and third LED chip combinations 61, 62, and 63 are one example, such that the first, second, and third LED chip combinations 61, 62, and 63 may be applied without classifying the internal/external array layouts, the front coaxial array layout, and the upward/downward array layouts.

As an example, the first, second, and third LED chip combinations 61, 62, and 63 implement the first, ..., Nth LED chips 60A to 60N of the LED chip 60 by a YELLOW LED of a yellow color, a RED LED of a red color, a BLUE LED of a blue color, and a GREEN LED of a green color. In this case, the RED LED may be used as a color for lighting patterns such as TAIL, STOP, SIDE MARKER, and high mounted stop lamp (HMSL), and the GREEN LED may be used as a color for displaying an autonomous traveling of an autonomous vehicle.

Referring to the first LED chip combination 61 of the section A-A, the first LED chip combination 61 generates the lighting of a WHITE color by the first LED chip 60A of the YELLOW LED and the second LED chip 60B of the BLUE LED.

Referring to the second LED chip combination 62 of the section B-B, the second LED chip combination 62 generates the lighting of the WHITE color by the second LED chip 60B of the BLUE LED, the third LED chip 60C of the GREEN LED, and the fourth LED chip 60D of the RED LED.

Referring to the third LED chip combination 63 of the section C-C, the third LED chip combination 63 generates the lighting of an AMBER color by the third LED chip 60C of the GREEN LED, the first LED chip 60A of the YELLOW LED, and the fourth LED chip 60D of the RED LED.

Therefore, the WHITE color lighting of the first LED chip combination 61 and the WHITE color lighting of the second LED chip combination 62 may selectively turn on the corresponding LED chip, thereby being applied for implementing various functions for the lighting patterns such as POSITION, DRL, LOW, HIGH, assistant LOW, and BACK UP, and the AMBER color lighting of the third LED chip combination 63 may selectively turn on the corresponding LED chip, thereby being applied for implementing a vehicle direction function such as TURN.

Particularly, it is apparent that the first, second, and third LED chip combinations 61, 62, and 63 may use a combination method of the color required for each function to selectively turn on the LED chip, thereby implementing a multi-function according to the color combinations not exemplified.

In one embodiment, a vehicle 100 illustrated in FIGS. 8 to 12 exemplifies a lamp system 200 to which the rotation light source device 1 illustrated in FIGS. 1 to 7 is applied.

Hereinafter, the signal transmitter 80 of the rotation light source device 1 is provided in the lamp system 200 and connected to an external input connector (not illustrated) receiving a power source and a lighting signal to supply a power source and perform a synchronization operation of the LED chip, which are general functions of a lamp driving circuit, according to an operation of the lamp system 200.

Figure 8:
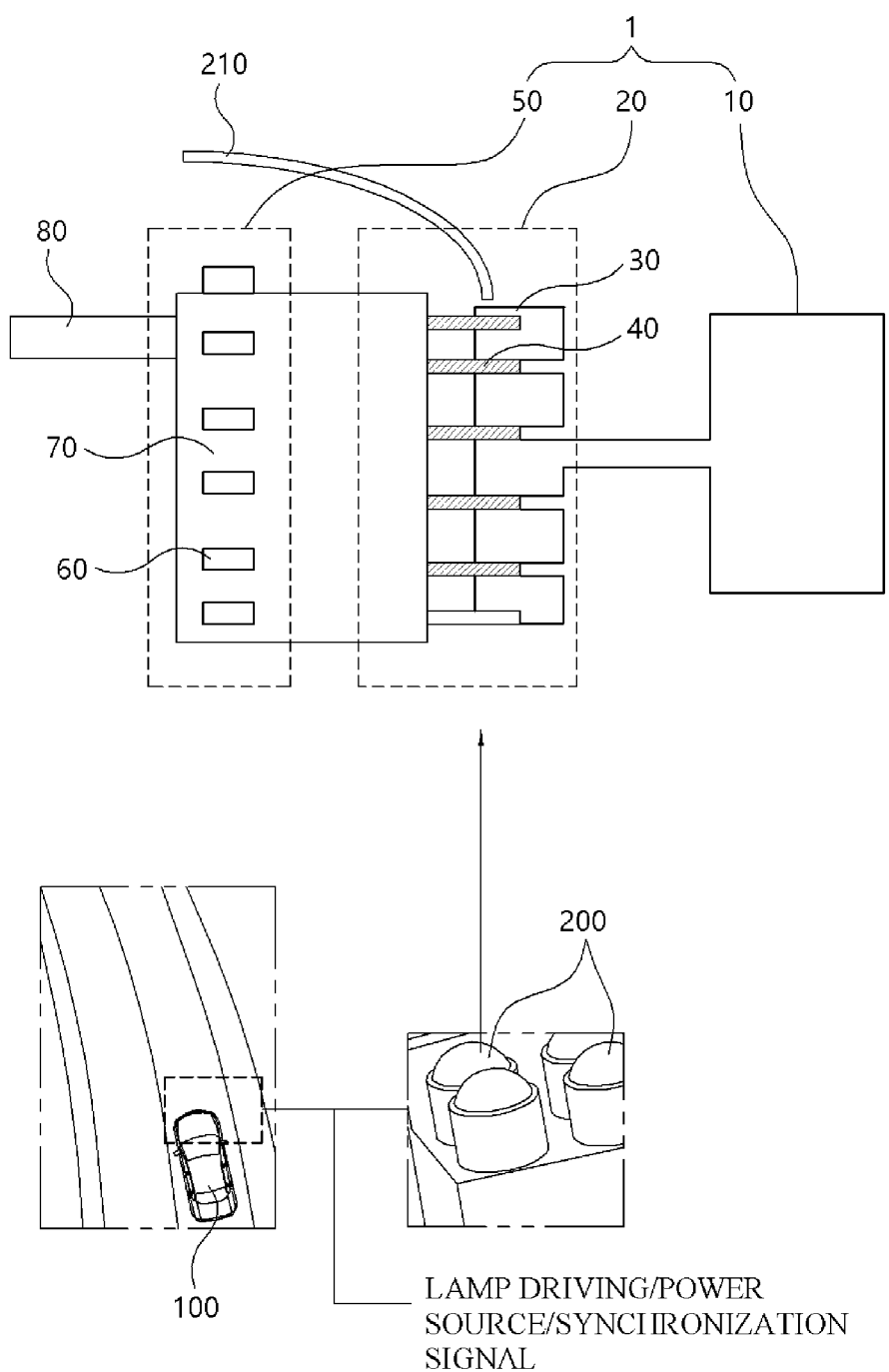
FIG. 8 is a diagram illustrating an example in which a lamp system of a vehicle according to the present disclosure is constituted by applying a reflector together with the rotation light source device.
Figure 9:
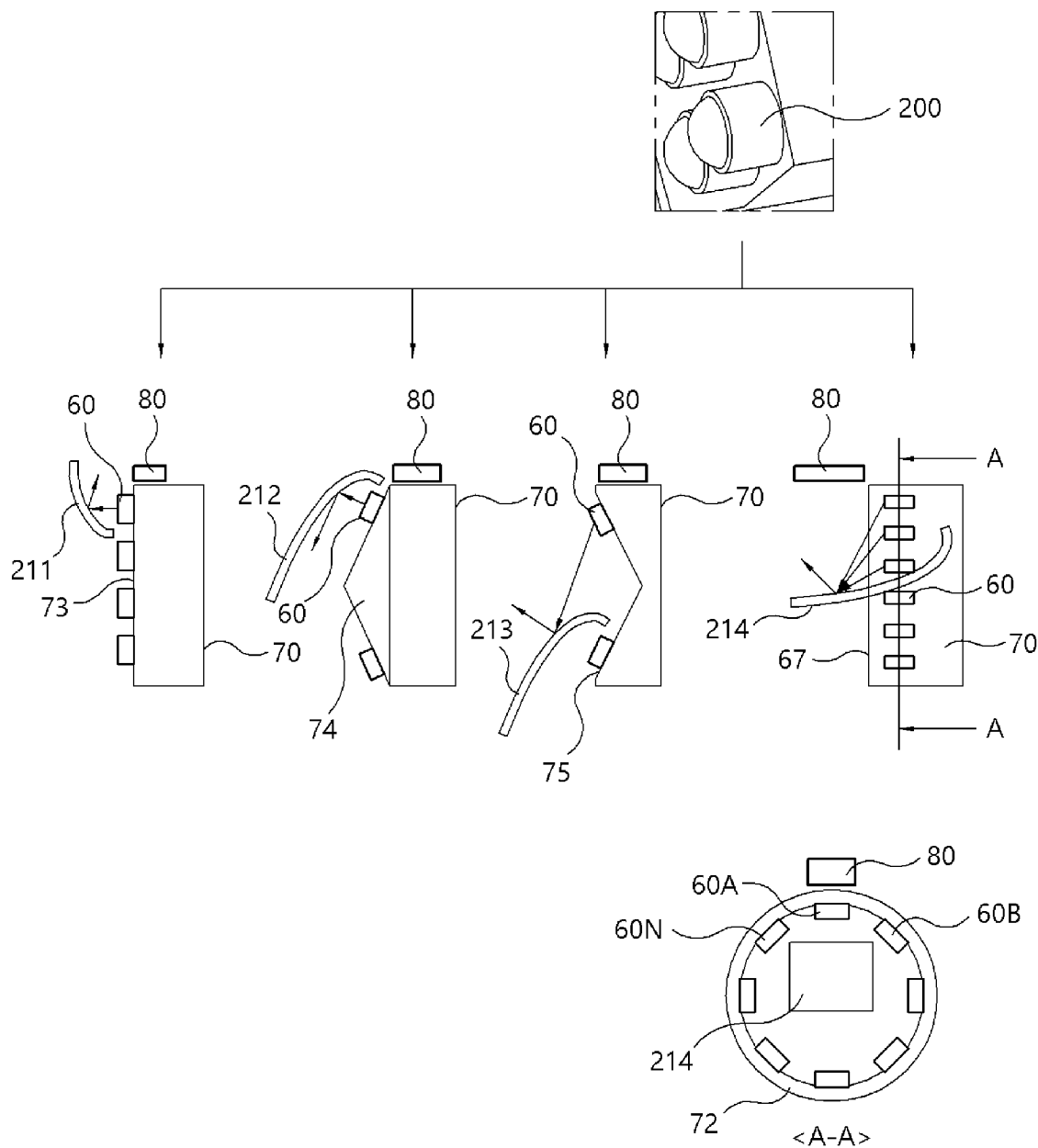
FIG. 9 is a diagram illustrating an example in which the lamp system according to the present disclosure variously modifies and applies the reflector.

FIGS. 8 and 9 illustrate an example in which the lamp system 200 combines reflectors 210, 211, 212, 213, 214 with the rotation light source device 1.

FIG. 8 illustrates that the vehicle 100 uses the lamp system 200 as a headlight, and the lamp system 200 combines the embedded rotation light source device 1 with the reflector 210, thereby enhancing a light condensation rates for the first, . . . , Nth LED chips 60A to 60N of the LED chip 60.

As an example, the reflector 210 as an optical element operates to condense the light of the LED light source to transmit the light to a desired region for various lighting patterns and signaling signal. In this case, the reflector 210 is combined together with the external array layout (see FIG. 1) of the LED chip 60.

To this end, the reflector 210 is arranged at an upward position covering the rotation force receiver 40, the LED circuit unit 70, and the signal transmitter 80 to condense the light in an upward light path through which the LED light source of the LED chip of the first, . . . , Nth LED chips 60A to 60N of the LED chip 60 is emitted.

Therefore, the reflector 210 condenses the light of one or more LED chips in which the plurality of first, . . . , Nth LED chips 60A to 60N are operated by the synchronization in the rotation state of the circular arrangement, such that it is possible to efficiently use the light because a focus of a reflection surface of the reflector 210 and a light concentration factor at the position of the LED chip are high as the LED chip is small.

As described above, the lamp system 200 may use only one reflector 210 using the advantages of the first, . . . , Nth LED chips 60A to 60N circularly arranged, and as a result, it is possible to prevent loss of the optical efficiency which inevitably occurs due to reflection and transmission in the case of using a plurality of reflection surfaces for condensation.

On the other hand, FIG. 9 illustrates that the reflector 210 is variously modified into the first, second, third, and fourth reflectors 211, 212, 213, and 214 and combined with the first, . . . , Nth LED chips 60A to 60N. In this case, each of the first, second, third, and fourth reflectors 211, 212, 213, and 214 is classified by varying the sizes and focal positions thereof.

As an example, the first reflector 211 may be combined with the front coaxial array layout (see FIG. 5) of the LED chip 60, thereby being constituted to be parallel with the rotation direction at the front of the LED circuit unit 70 together with the first, . . . , Nth LED chips 60A to 60N. Therefore, the first reflector 211 may be directly connected to the corresponding LED chip through which light is emitted, thereby adjusting the size for condensing the light of the LED light source and implementing a smaller size.

As an example, the second reflector 212 may be combined with the upward array layout (see FIG. 6) of the LED chip 60, thereby surrounding the first, . . . , Nth LED chips 60A to 60N having a constant tilted angle formed with respect to the outside at the upward cone tilted angle ($A_{up}$) at the front of the LED circuit unit 70. Further, the third reflector 213 may be combined with the downward array layout (see FIG. 6) of the LED chip 60, thereby surrounding the first, . . . , Nth LED chips 60A to 60N having a constant tilted angle formed with respect to the outside at the downward cone tilted angle ($A_{down}$) at the front of the LED circuit unit 70.

Therefore, each of the second and third reflectors 212, 213 condenses (i.e., the operation of the second reflector 212) or spreads (i.e., the operation of the third reflector 213) the light emitted by the LED light source of one or more LED chips of the first, . . . , Nth LED chips 60A to 60N.

As an example, the fourth reflector 214 may be combined with the internal array layout (see FIG. 5) of the LED chip 60, thereby being constituted to be parallel with the rotation direction at the front of the LED circuit unit 70 together with the first, . . . , Nth LED chips 60A to 60N.

Therefore, the fourth reflector 214 may condense the light emitted by one or more corresponding LED chips positioned on the inner diameter 72 of the LED circuit unit 70 inside the LED circuit unit 70, thereby narrowing an optical angle according to a position deviation even if colors of the light emitted by the plurality of LED chips are different, and as a result, it is possible to have the advantage capable of easily implementing the first, second, and third LED chip combinations 61, 62, and 63 (see FIG. 7).

Figure 10:
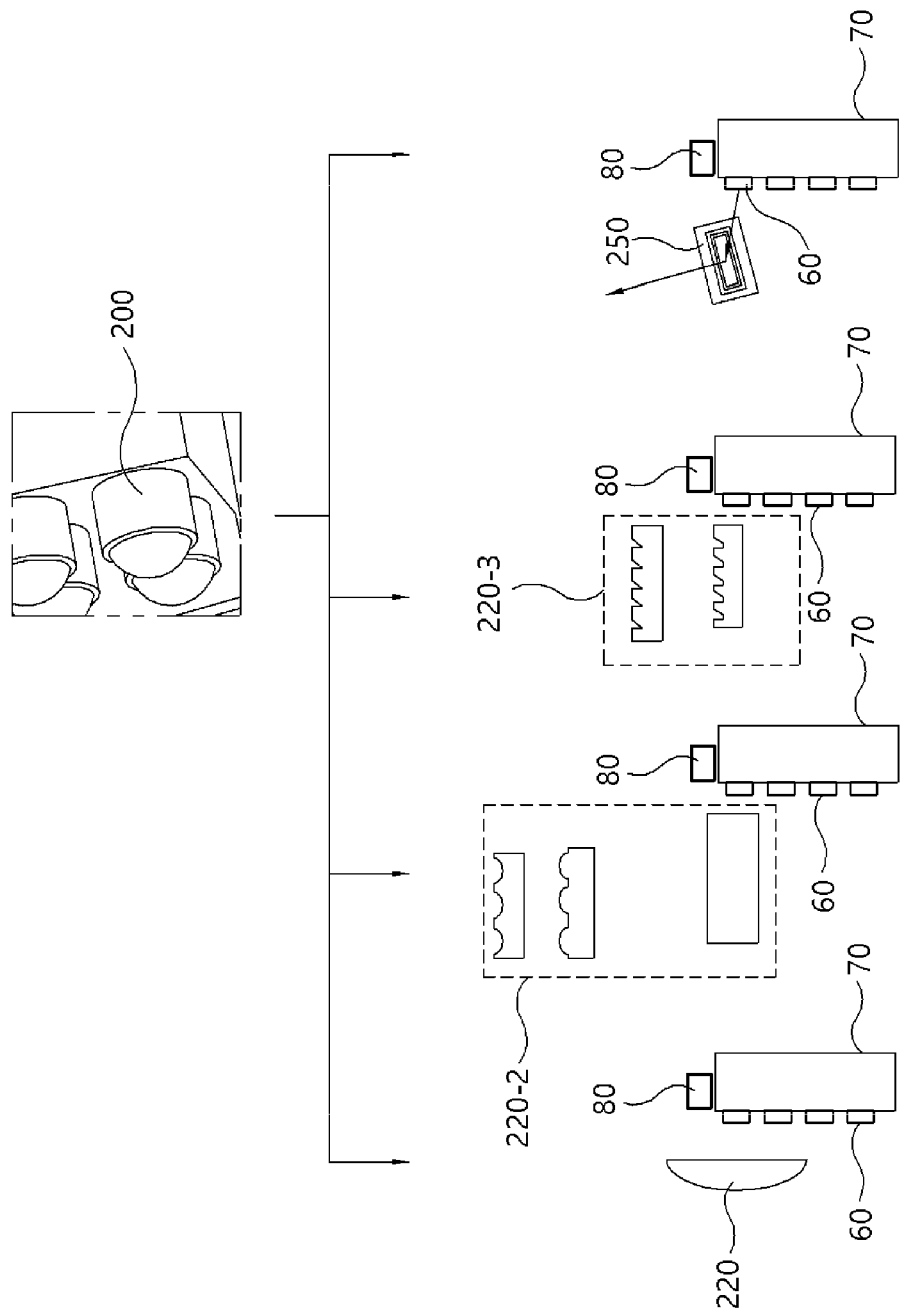
FIG. 10 is a diagram illustrating an example in which the lamp system according to the present disclosure is constituted by applying any one of a lens, a light guide, and a DMD together with the rotation light source device.

FIG. 10 illustrates an example in which the lamp system 200 combines an optical member 220 or a digital micromirror display (DMD) 250 with the rotation light source device 1.

As illustrated, the optical member 220 is composed of any one of an aspherical lens 220-1, a low pressure injection lens 220-2, and a light guide 220-3 and positioned at the front of the LED circuit unit 70, and the digital micromirror display (DMD) 250 is positioned at the front of the LED circuit unit 70. In this case, each of the aspherical lens 220-1, the low pressure injection lens 220-2, the light guide 220-3, and the DMD 250 is combined with the front coaxial array layout (see FIG. 5) of the LED chip 60.

As an example, the aspherical lens 220-1 is constituted to be parallel with the rotation direction at the front of the LED circuit unit 70 together with the first, . . . , Nth LED chips 60A to 60N, the low pressure injection lens 220-2 is constituted to be parallel with the rotation direction at the front of the LED circuit unit 70 together with the first, . . . , Nth LED chips 60A to 60N, and the light guide 220-3 is constituted to be parallel with the rotation direction at the front of the LED circuit unit 70 together with the first, . . . , Nth LED chips 60A to 60N. Therefore, each of the aspherical lens 220-1, the low pressure injection lens 220-2, and the light guide 220-3 may substitute the reflectors 210, 211, 212, 213, 214, thereby obtaining the same effects as those of the reflectors 210, 211, 212, 213, 214.

Particularly, the low pressure injection lens 220-2 may form a flat straight line, or a concave or convex surface to adjust full reflection performance of the light, and may be directly connected to the corresponding LED chip through which light is emitted to adjust the size for condensing the light of the LED light source, thereby implementing a smaller size to decrease the weight and cost of the low pressure injection lens.

Further, the light guide 220-3 may variously form the surface in a wave shape or a sawtooth shape, thereby adjusting the full reflection effect of the light more variously.

Particularly, the light guide 220-3 may use the advantage of the first, . . . , Nth LED chips 60A to 60N circularly arranged, thereby eliminating all of the overall problems of lowering the optical efficiency caused by increasing the thickness of the light guide in proportion to the number of light sources increased in the case of increasing the number of LEDs to increase the light amount and lowering competitiveness due to the increase in an injection time and the increase in the cost and the weight.

As an example, the DMD 250 may condense the light of the first, . . . , Nth LED chips 60A to 60N at the front of the LED circuit unit 70 and use the condensed light, thereby reducing the conventional structure for condensation (e.g., DLP using DLP5531-Q1 or the like).

In this case, the DMD 250 means a device for achieving the high definition image as the device integrating hundreds of thousands of reflective elements for reflecting light into one chip.

FIG. 11 illustrates an example in which the lamp system 200 combines a shield 300 with the fourth reflector 214 and the rotation light source device 1. In this case, the shield 300 is formed of a bezel for absorbing light, such that the light is emitted through only a cutoff shape.

As an example, the shield 300 is arranged to be parallel with the rotation direction at the front of the LED circuit unit 70 together with the first, . . . , Nth LED chips 60A to 60N, and positioned upwardly from the reflector 21, and particularly, the shield 300 is formed of various cutoff shapes to send more or less light to required positions in an up/down/left/right symmetric manner.

To this end, the cutoff shape of the shield 300 may apply any one of an asymmetric cutoff shape 301, a symmetric cutoff shape 302, and an open cutoff shape 303. In this case, the shield 300 and the fourth reflector 214 are combined with the internal array layout (see FIG. 5) of the LED chip 60.

As an example, the asymmetric cutoff shape 301 is formed as a perforation of the cutoff having different sizes and shapes of left/right cutoffs in some regions of the entire section of the shield 300, the symmetric cutoff shape 302 is formed as a perforation of the cutoff having the same sizes and shapes of top/bottom cutoffs in some regions of the entire section of the shield 300, and the open cutoff shape 303 is formed by cutting the sizes and shapes of left/right cutoffs in a lower section of the entire section of the shield 300.

Therefore, the shield 300 may also be formed with the cutoff of the lighting pattern downward, and the formation of the downward cutoff may be suitably applied to the lighting pattern required by the lamp (e.g., FR lamp) of the urban air mobility (UAM).

FIG. 12 illustrates an example in which the lamp system 200 uses the shield 300 as an optical shield module 400 to be combined with the rotation light source device 1.

As illustrated, the optical shield module 400 may be classified into a partially integrated optical shield module 400-1 and an entirely integrated optical shield module 400-2. In this case, an example in which the partially integrated optical shield module 400-1 and the entirely integrated optical shield module 400-2 are combined with the internal array layout (see FIG. 5) of the LED chip 60 will be described.

Particularly, the partially integrated optical shield module 400-1 and the entirely integrated optical shield module 400-2 have the integral structure of the signal transmitter 80 and the shield 300, thereby allowing the power source and the synchronization signal of the LED generated by the signal transmitter 80 to turn on the LED at the accurate position due to the correlation with the shield 300 to make accurate cutoffs.

Therefore, the integral structure may provide the advantage capable of turning on the LED at the accurate position (i.e., focus) required for the shield 300 to form the cutoff of the lighting pattern or the beam pattern in the asymmetric cutoff shape 301 compared to the separation structure of the signal transmitter 80 and the shield 300.

As an example, the partially integrated optical shield module 400-1 is composed of the signal transmitter 80, the fourth reflector 214, and the shield 300, and the shield 300 forms a structure of being separated from the fourth reflector 214 in the state of being integrated with the signal transmitter 80. In this case, the signal transmitter 80 may be positioned in an upper region of the asymmetric cutoff shape 301, thereby being formed in a circular shape or a square shape matched with the size of the shield region out of the asymmetric cutoff shape 301 of the shield 300.

On the other hand, the entirely integrated optical shield module 400-2 is composed of the signal transmitter 80, the fourth reflector 214, and the shield 300, and the shield 300 forms a structure in which the signal transmitter 80 and the fourth reflector 214 are all integrated. In this case, the signal transmitter 80 is formed in a ring shape like a rim surrounding the asymmetric cutoff shape 301, thereby being matched with the size of the asymmetric cutoff shape 301. Further, the fourth reflector 214 may horizontally form a protrusion to which the shield 300 is attached on one edge thereof.

As described above, the lamp system 200 applied to the vehicle 100 according to the present exemplary embodiment is provided with any one of the reflector 210, the optical member 220, the digital micromirror display (DMD) 250, the shield 300, and the shield optical module 400, and is combined with the rotation light source device 1 for generating the light of the specific LED turned on at the synchronized rotation position of one or more LED chips of the plurality of first, . . . , Nth LED chips (N is an integer of 2 or more) per one rotation while being rotated by the current application of the signal transmitter 80 receiving the lamp turn-on signal of the vehicle 100, thereby generating various lighting patterns even while eliminating all problems of increasing the layout/decreasing the light amount/increasing the amount of property changed, lowering the reflection efficiency/transmission efficiency, and losing the optical efficiency with the circular LED array.

What is claimed is:

1. A rotation light source device comprising:
a rotation mechanism configured to receive a rotation force of a power source;
an LED circuit unit including a plurality of LED chips and rotatable by the rotation mechanism, the plurality of LED chips comprising first to Nth LED chips, where N is an integer of 2 or more; and
a signal transmitter configured to transmit a synchronization signal for a position and a current application signal for turn-on to the LED circuit unit such that light is emitted by an LED chip reaching a turn-on position of the first to Nth LED chips per one rotation while the first to Nth LED chips rotate together with the LED circuit unit,
wherein the rotation mechanism comprises:
a rotation force transmitter rotatable by the power source; and
a rotation force receiver fixed to the LED circuit unit and coaxially connected to the rotation force transmitter to deliver a rotation force.

2. The rotation light source device of claim 1,
wherein the rotation force transmitter and the rotation force receiver have a shape of a hollow cylinder to form a coupling section delivering the rotation force, and
wherein the coupling section includes a circular rotation section in which some portions of the rotation force transmitter and some portions of the rotation force receiver are circularly coupled.

3. The rotation light source device of claim 2,
wherein the circular rotation section has the rotation force transmitter including a plurality of insertion legs, and the rotation force receiver including a plurality of fixing legs to be adjacent to each other to form a circle, the plurality of insertion legs comprising first to Nth insertion legs and the plurality of fixing legs comprising first to Nth fixing legs, where N is an integer of 2 or more.

4. The rotation light source device of claim 1,
wherein the rotation force transmitter and the rotation force receiver have a shape of a hollow cylinder to form a coupling section delivering the rotation force,
wherein the coupling section includes a concentric rotation section in which some portions of the rotation force transmitter and some portions of the rotation force receiver overlap in an axial direction of the rotation force transmitter or rotation force receiver, or
an intersecting concentric rotation section in which some portions of the rotation force transmitter and some portions of the rotation force receiver overlap in the axial direction to form a concentric circle, and some portions of a power receiver are adjacent to some portions of the rotation force transmitter to form a circle.

5. The rotation light source device of claim 4,
wherein the concentric rotation section has the rotation force transmitter including a plurality of stators, and the rotation force receiver including a plurality of permanent magnets to form a concentric circle with respect to the rotation force transmitter.

6. The rotation light source device of claim 4,
wherein the intersecting concentric rotation section has the rotation force receiver including a plurality of permanent magnets, and the power receiver including a plurality of power reception legs to form a circle adjacent to each other, the plurality of power reception legs comprising first to Nth power reception legs, where N is an integer of 2 or more, and
has the rotation force transmitter including a plurality of stators to form a concentric circle with respect to the rotation force receiver and the power receiver.

7. The rotation light source device of claim 6,
wherein the power receiver generates power by electromagnetic force induction with the rotation force transmitter, and
wherein the power is supplied to the first to Nth LED chips as a current to substitute the current application signal transmitted by the signal transmitter.

8. The rotation light source device of claim 1,
wherein the first to Nth LED chips are configured in an LED combination of a YELLOW LED, a RED LED, a BLUE LED, and a GREEN LED, and
wherein the LED combination implements any one of a WHITE color lighting of the YELLOW LED and the BLUE LED, a WHITE color lighting of the BLUE LED and the GREEN LED, or an AMBER color lighting of the GREEN LED, the YELLOW LED, and the RED LED.

9. The rotation light source device of claim 1,
wherein the first to Nth LED chips are disposed on an outer circumference of the LED circuit unit, and
configured to illuminate light to an outside of the LED circuit unit.

10. The rotation light source device of claim 1,
wherein the first to Nth LED chips are disposed on any one of an inner circumference, a front flat plate, a front convex cone, or a front concave cone of the LED circuit unit.

11. The rotation light source device of claim 10,
wherein the first to Nth LED chips condense the light luminated from the inner circumference to an inside of the LED circuit unit.

12. The rotation light source device of claim 10,
wherein the first to Nth LED chips match an optical axis of the LED circuit unit with a rotation axis of the rotation mechanism on the front flat plate.

13. The rotation light source device of claim 10,
wherein the first to Nth LED chips tilt the light upwardly with respect to the LED circuit unit on the front convex cone.

14. The rotation light source device of claim 10,
wherein the first to Nth LED chips tilt the light downwardly with respect to the LED circuit unit on the front concave cone.

15. The rotation light source device of claim 1,
wherein the signal receiver simultaneously applies the synchronization signal and the current application signal to the LED circuit unit or applies any one of the synchronization signal or the current application signal and separately applies a remaining one of the synchronization signal or the current application signal.

16. The rotation light source device of claim 1,
wherein the signal receiver forms synchronization with an LED light reaching a turn-on position of the first to Nth LED chips at any one position of an outer circumference, an inner circumference, a front flat plate, a front convex cone, or a front concave cone of the LED circuit unit.

* * * * *